US009881038B2

United States Patent
Devasthali et al.

(10) Patent No.: US 9,881,038 B2
(45) Date of Patent: *Jan. 30, 2018

(54) ARCHIVE MIGRATION SYSTEM

(71) Applicant: International Business Machines Corporation, Armonk, NY (US)

(72) Inventors: Snehal S. Devasthali, Pune (IN); Swanand S. Gadre, Pune (IN); Nilesh R. Gujarathi, Pune (IN); Girish Padmanabhan, Pune (IN); Rajesh V. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/690,530

(22) Filed: Apr. 20, 2015

(65) Prior Publication Data

US 2016/0308782 A1 Oct. 20, 2016

(51) Int. Cl.
*G06F 17/30* (2006.01)
*G06F 3/06* (2006.01)
*G06F 15/173* (2006.01)
*G06F 15/16* (2006.01)

(52) U.S. Cl.
CPC ...... *G06F 17/30309* (2013.01); *G06F 3/0605* (2013.01); *G06F 3/067* (2013.01); *G06F 3/0647* (2013.01); *G06F 17/303* (2013.01)

(58) Field of Classification Search
CPC ............ G06F 17/30309; G06F 17/303; G06F 3/0647; G06F 3/0653; G06F 3/067; H04L 67/1095
USPC ................................................ 709/226, 217
See application file for complete search history.

(56) References Cited

U.S. PATENT DOCUMENTS

| 5,930,337 | A | 7/1999 | Mohler |
| 7,552,182 | B2 | 6/2009 | Raghunandan |
| 7,730,146 | B1 | 6/2010 | Mace et al. |
| 8,601,075 | B2 | 12/2013 | Chen et al. |
| 9,716,753 | B2 * | 7/2017 | Piyush ................ H04L 67/1095 |
| 2005/0097126 | A1 * | 5/2005 | Cabrera ............ G06F 17/30067 |
| 2006/0294039 | A1 * | 12/2006 | Mekenkamp ......... G06F 17/301 |
| 2007/0243860 | A1 | 10/2007 | Aiello et al. |

(Continued)

FOREIGN PATENT DOCUMENTS

| JP | 4335559 B2 | 9/2009 |
| WO | 2012035574 A1 | 3/2012 |

OTHER PUBLICATIONS

IBM Tivoli Training, IBM Tivoli Storage Manager 5.3 Storage Pool Backups, Oct. 6, 2006, IBM Corporation, ftp://ftp.software.ibm.com/software/iea/content/com.ibm.iea.tsm/tsm/5.3/Administration/IEA_TSM_STGPool.pdf.*

(Continued)

*Primary Examiner* — David Lazaro
*Assistant Examiner* — Zi Ye
(74) *Attorney, Agent, or Firm* — Erik K. Johnson

(57) ABSTRACT

A computer detects that a threshold value associated with a storage capacity of a first storage account has been exceeded. The computer determines one or more other storage accounts to migrate a determined amount of data contained in the first storage account, wherein the determined one or more storage accounts are linked to the first storage account. The computer migrates the determined amount of data from the first storage account to the determined one or more other storage accounts.

9 Claims, 3 Drawing Sheets

(56) References Cited

U.S. PATENT DOCUMENTS

| | | | |
|---|---|---|---|
| 2008/0201431 | A1 | 8/2008 | Ahn et al. |
| 2010/0161737 | A1 | 6/2010 | Consul et al. |
| 2010/0217805 | A1 | 8/2010 | Lavoie et al. |
| 2011/0264630 | A1 | 10/2011 | Edelen |
| 2011/0314170 | A1 | 12/2011 | Gisby |
| 2012/0158882 | A1 | 6/2012 | Oehme et al. |
| 2012/0259817 | A1 | 10/2012 | Baessler et al. |
| 2013/0110778 | A1* | 5/2013 | Taylor ............... G06F 17/30215 707/624 |
| 2014/0324860 | A1* | 10/2014 | Rogers ................. G06F 3/0625 707/736 |
| 2016/0219109 | A1* | 7/2016 | Blahaerath .......... H04L 67/1097 |

OTHER PUBLICATIONS

Devasthali et al., "Archive Migration System," U.S. Appl. No. 15/043,987, filed Feb. 15, 2016.

List of IBM Patents or Patent Applications Treated as Related, signed Feb. 12, 2016, 2 pages.

Disclosed Anonymously, "Mail rebalancing incorporating proximity," ip.com, IP.com No. 000201095, IP.com Electronic Publication: Nov. 8, 2010, pp. 1-2.

IBM, "System and Method to provide 'extended mail storage' to augment the limited mail server storage.," ip.com, Original Publication Date: Oct. 6, 2008, IP.com No. 000175230, IP.com Electronic Publication: Oct. 6, 2008, pp. 1-7.

Raphaelth, "Backup P2P—Secured peer-to-peer backup," SourceForge.net, http://sourceforge.net/projects/p2pbackupsmile/, accessed on Dec. 23, 2014, pp. 1-3.

\* cited by examiner

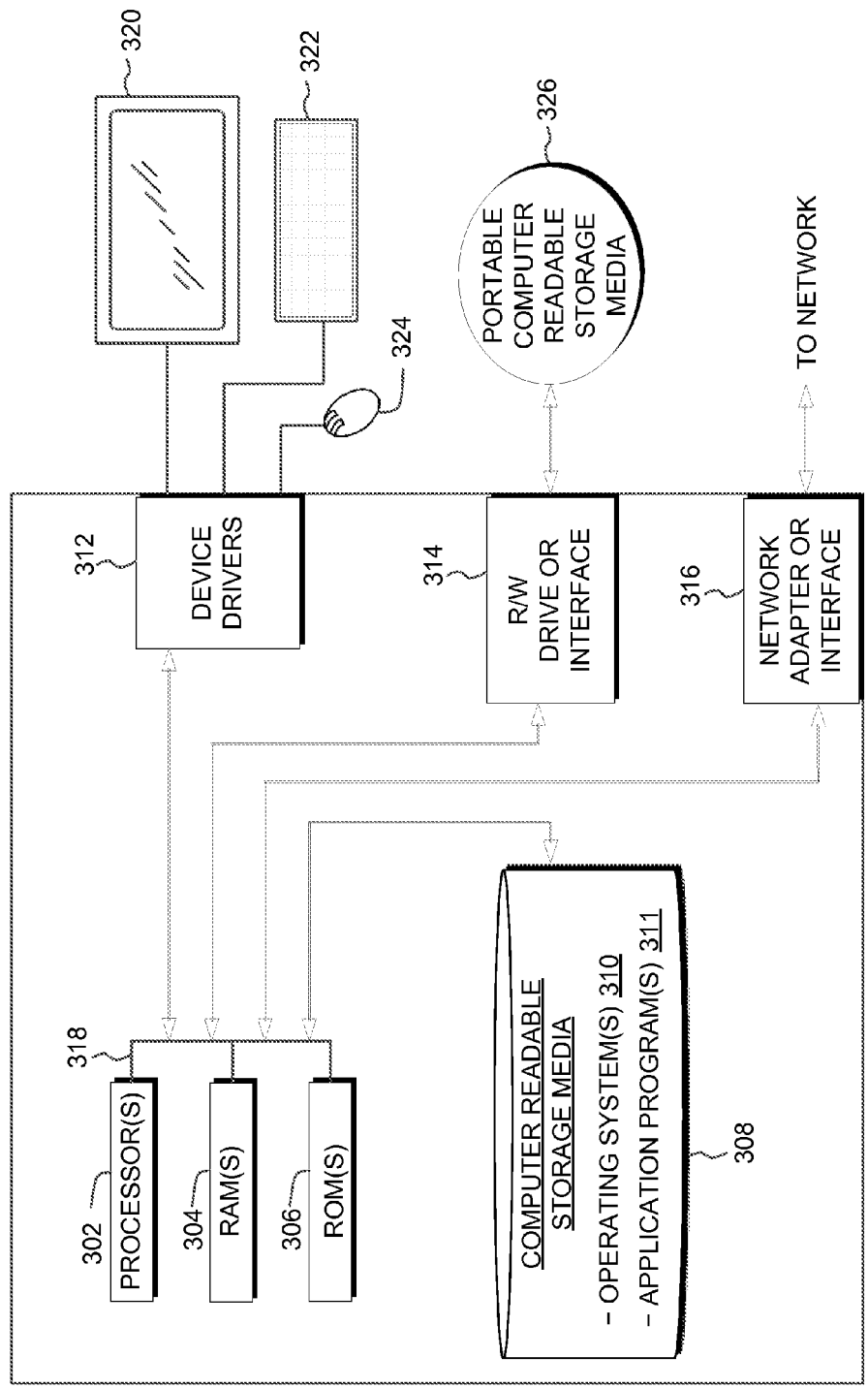

ARCHIVE MIGRATION SYSTEM

TECHNICAL FIELD

The present invention relates generally to archiving, and more particularly to the migration of archived data.

BACKGROUND

Archiving is a necessary part of today's day and age. With the sheer volume of data that is stored both personally and by corporations, an alternative storage location is often needed in order to assure that no important data is deleted. Often, companies that provide server-side archive storage provide a small portion of storage for free in order to entice clients, however, after this small portion is exceeded, storage space can be quite expensive.

SUMMARY

The present invention provides a method, system, and computer program product for determining one or more accounts for the migration of data. A computer detects that a threshold value associated with a storage capacity of a first storage account has been exceeded. The computer determines one or more other storage accounts to migrate a determined amount of data contained in the first storage account, wherein the determined one or more storage accounts are linked to the first storage account. The computer migrates the determined amount of data from the first storage account to the determined one or more other storage accounts.

BRIEF DESCRIPTION OF THE DRAWINGS

FIG. 3 is a block diagram depicting the hardware components of the archive system of FIG. 1, in accordance with an embodiment of the invention.

DETAILED DESCRIPTION

Embodiments of the present invention will now be described in detail with reference to the accompanying Figures.

Figure 1:
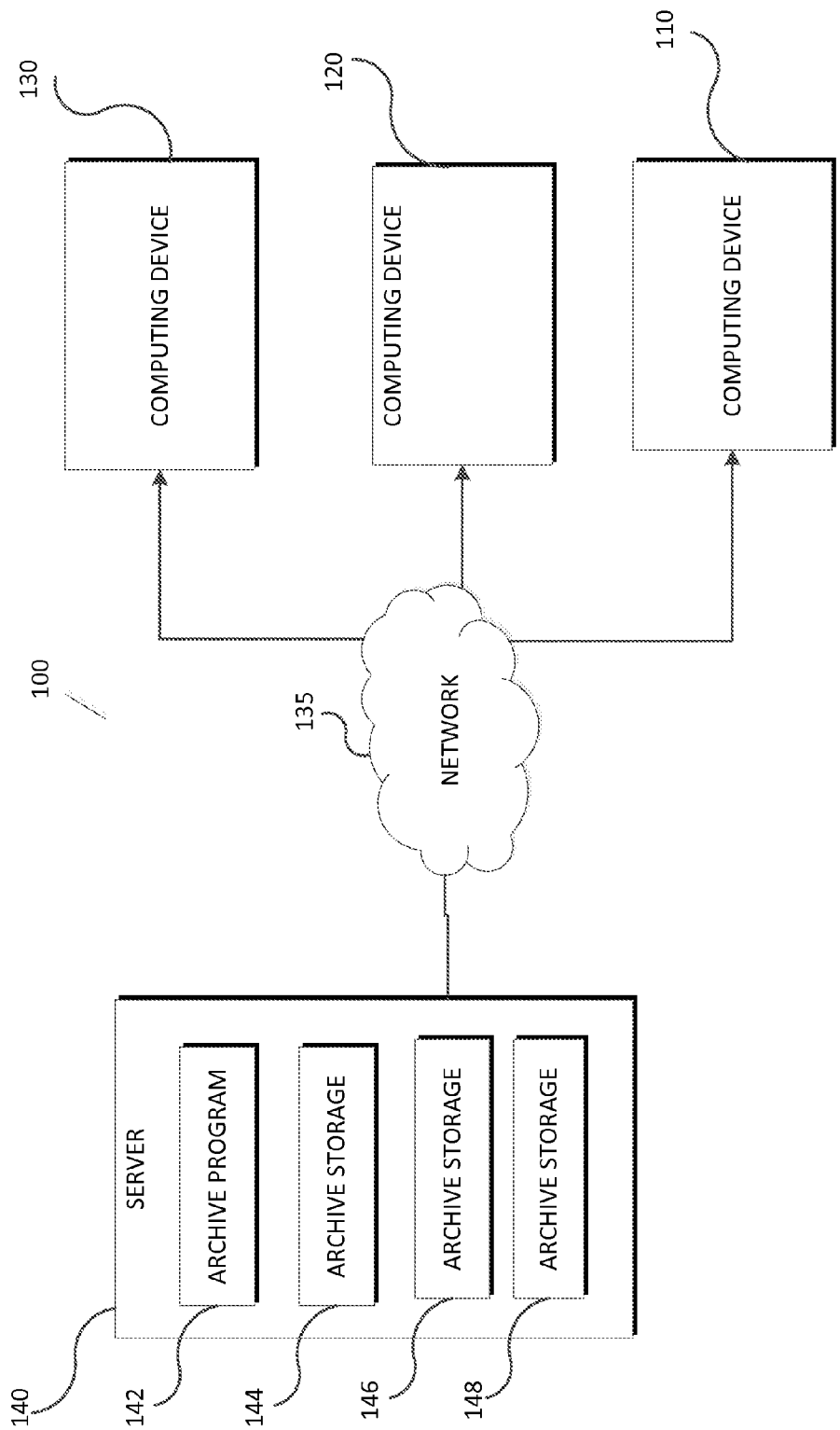
FIG. 1 illustrates an archive migration system, in accordance with an embodiment of the invention.

FIG. 1 illustrates archive system 100, in accordance with an embodiment of the invention. In an exemplary embodiment, archive system 100 includes computing device 110, computing device 120, computing device 130 and server 140 all interconnected via network 135.

In the example embodiment, network 135 is the Internet, representing a worldwide collection of networks and gateways to support communications between devices connected to the Internet. Network 135 may include, for example, wired, wireless, or fiber optic connections. In other embodiments, network 135 may be implemented as an intranet, a local area network (LAN), or a wide area network (WAN). In general, network 135 can be any combination of connections and protocols that will support communications between computing device 110, computing device 120, computing device 130, and server 140.

Computing device 110 may be a desktop computer, a notebook, a laptop computer, a tablet computer, a handheld device, a smart-phone, a thin client, or any other electronic device or computing system capable of receiving and sending data to and from other computing devices, such as server 140, via network 135. Although not shown, optionally, computing device 110 can comprise a cluster of web devices executing the same software to collectively process requests. Computing device 110 is described in more detail with reference to FIG. 3.

Computing device 120 may be a desktop computer, a notebook, a laptop computer, a tablet computer, a handheld device, a smart-phone, a thin client, or any other electronic device or computing system capable of receiving and sending data to and from other computing devices, such as server 140, via network 135. Although not shown, optionally, computing device 120 can comprise a cluster of web devices executing the same software to collectively process requests. Computing device 120 is described in more detail with reference to FIG. 3.

Computing device 130 may be a desktop computer, a notebook, a laptop computer, a tablet computer, a handheld device, a smart-phone, a thin client, or any other electronic device or computing system capable of receiving and sending data to and from other computing devices, such as server 140, via network 135. Although not shown, optionally, computing device 130 can comprise a cluster of web devices executing the same software to collectively process requests. Computing device 130 is described in more detail with reference to FIG. 3.

Server 140 includes archive program 142, archive storage 144, archive storage 146, and archive storage 148. Server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 135. Although not shown, optionally, server 140 can comprise a cluster of web servers executing the same software to collectively process the requests for the web pages as distributed by a front end server and a load balancer. Server 140 is described in more detail with reference to FIG. 3.

Archive storage 144 is an archive storage account pertaining to a portion of one or more storage devices allocated to the user of computing device 110. In the example embodiment, data transmitted to server 140 by the user of computing device 110 for the purposes of archiving is stored in the portion of one or more storage devices corresponding to archive storage 144.

Archive storage 146 is an archive storage account pertaining to a portion of one or more storage devices allocated to the user of computing device 120. In the example embodiment, data transmitted to server 140 by the user of computing device 120 for the purposes of archiving is stored in the portion of one or more storage devices corresponding to archive storage 146.

Archive storage 148 is an archive storage account pertaining to a portion of one or more storage devices allocated to the user of computing device 130. In the example embodiment, data transmitted to server 140 by the user of computing device 130 for the purposes of archiving is stored in portion of one or more storage devices corresponding to archive storage 148.

Archive program 142 is a program capable of determining whether an archive storage account has exceeded or will exceed a threshold percentage of the storage capacity allocated to the account. In addition, in the example embodiment, archive program 142 is capable of identifying which archive storage accounts are linked together and receiving and transmitting information related to the linkage between archive storage accounts. Archive program 142 is further capable of migrating data between archive storage accounts. The operations and functions of archive program 142 are described in more detail with reference to FIG. 2.

Figure 2:
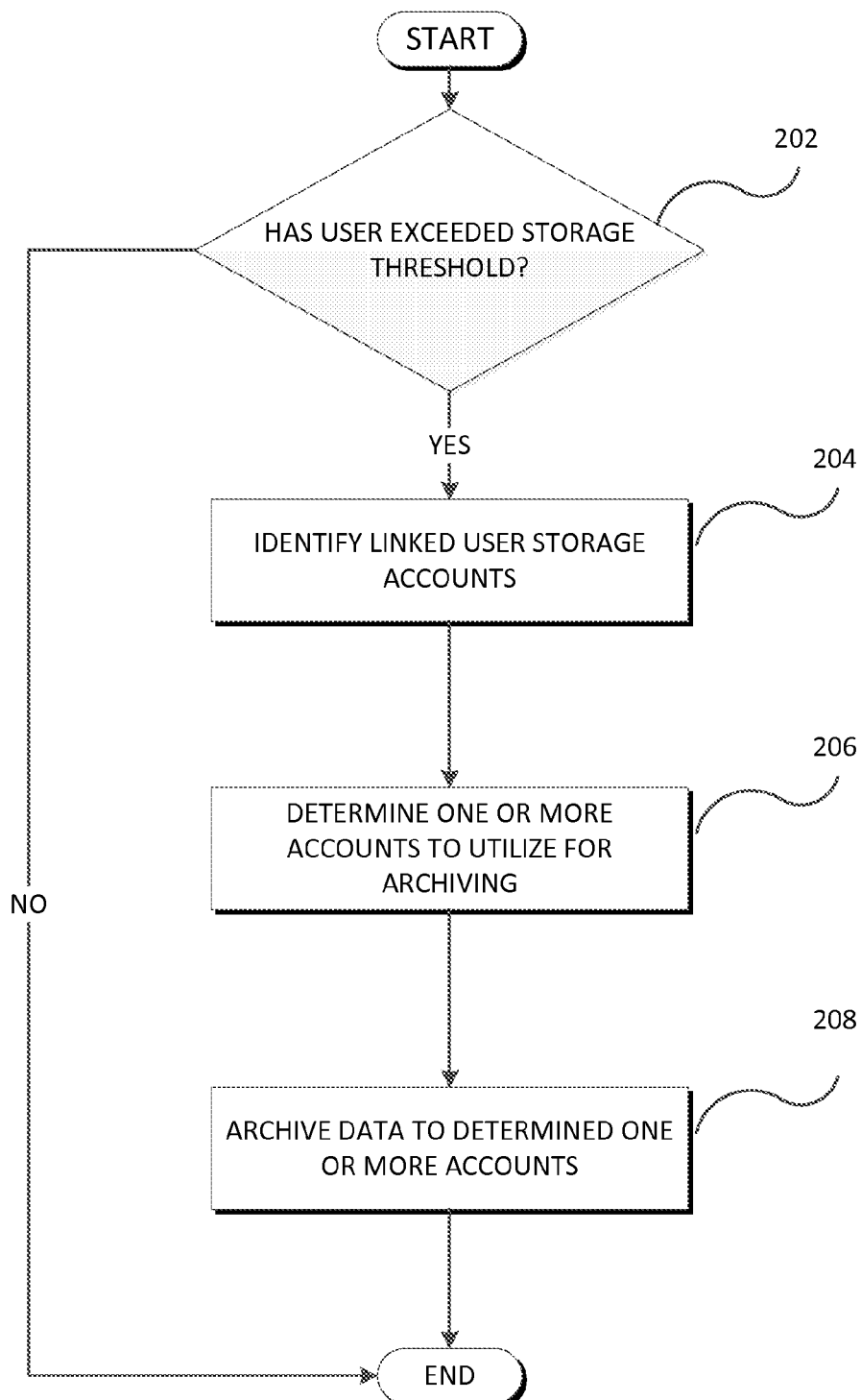
FIG. 2 is a flowchart illustrating the operations of the archive program of FIG. 1 in determining one or more accounts for the migration of archived data, in accordance with an embodiment of the invention.

FIG. 2 is a flowchart illustrating the operation of archive program 142 in determining whether an archive storage account has exceeded or will exceed a threshold percentage of the storage capacity allocated to the account. In the example embodiment, archive program 142 determines whether the user of computing device 110 has exceeded a threshold percentage based on the storage capacity allocated to the user of computing device 110 (decision 202). In the example embodiment, the threshold percentage is 90%. Therefore, archive program 142 determines whether the amount of data archived by the user of computing device 110 into the storage corresponding to archive storage 144 exceeds 90% capacity. For example, if the total storage capacity corresponding to archive storage 144 is 100 GB (gigabits), archive program 142 determines whether the amount of data archived by the user of computing device 110 exceeds 90 GB. In other embodiments, the threshold percentage may be a different value.

If archive program 142 determines that the user of computing device 110 has not exceeded the threshold percentage based on the storage capacity allocated to the user of computing device 110 (decision 202, "NO" branch) archive program 142 does not migrate any data from the storage capacity corresponding to archive storage 144. In other embodiments, the user of computing device 110 may initiate the migration of data to other archive storage accounts via user input.

If archive program 142 determines that the user of computing device 110 has exceeded the threshold percentage based on the storage capacity allocated to the user of computing device 110 (decision 202, "YES" branch), archive program 142 identifies archive storage accounts linked (or to be linked) to the archive storage account associated with the user of computing device 110 (i.e., archive storage 144) (step 204). In the example embodiment, archive storage program 142 receives user input from the user of computing device 110 via network 135 detailing the archive storage accounts that are to be linked to the archive storage 144 (the archive storage account of the user of computing device 110). In this embodiment, after receiving the user input, archive program 142 links the detailed archive storage accounts. For example, if the user of computing device 110 inputs that archive storage 146 and archive storage 148 are to be linked to the archive storage account of the user of computing device 110 (archive storage 144), archive program 142 links the archive storage accounts and maintains the linkage in memory. In other embodiments, archive program 142 may identify archive storage accounts to be linked to the archive storage 144 by analyzing the content of the archive storage 144. For example, if archive storage 144 contained primarily emails, archive program 142 may analyze the emails to determine the recipients of the transmitted emails and the senders of the received emails. If archive storage 144 determines that the primary recipients/senders ("most conversed users") are the user of computing device 120 and the user of computing device 130, archive program 142 may link archive storage 144 with archive storage 146 (associated with the user of computing device 120) and archive storage 148 (associated with the user of computing device 130). In further embodiments, archive program 142 may analyze all archive storage accounts to determine which archive storage accounts contain the largest amount of available space or may identify accounts to link based on available server quota. Furthermore, archive program 142 may also identify archive storage accounts to link to the account of the user of computing device 110 based on geographic location or geographic proximity to the user of computing device 110.

Archive program 142 then determines one or more accounts to utilize for archiving data from the archive storage account of the user of computing device 110 (archive storage 144) (step 206). In the example embodiment, archive program 142 determines one or more accounts to utilize for archiving data from archive storage 144 based on user input provided by the user of computing device 110. In the example embodiment, the user of computing device 110 provides input detailing a hierarchical list of the archive storage accounts to migrate data to in case that the threshold percentage for archive storage 144 is exceeded. In other embodiments, archive program 142 may split the amount of data determined to be archived based on the available amount that is available to migration to the linked archive storage accounts. For example, if 30 GB of data need to migrated and the linked archive storage accounts (determined to be archive storage 146 and archive storage 148) have 10 GB and 20 GB of available storage capacity, archive program 142 may split the 30 GB of data into 10 GB and 20 GB blocks. In addition, if 10 GB of data are relevant to the user of computing device 120 (i.e., the user of computing device is the recipient/sender of emails, owner/co-owner of documents, etc.), archive program 142 may split the data up so that all 10 GB relevant to the user of computing device 120 is migrated to archive storage 146 (associated with the user of computing device 120). Furthermore, if a third linked archive storage account has an available storage capacity of 30 GB or more, archive program 142 may, instead of splitting up the data, migrate all 30 GB of data to the third linked archive storage account. In addition, in the example embodiment, archive program 142 may migrate data based on the date created (i.e., in the case of emails, old emails are migrated, while newer emails are maintained in archive storage 144).

Archive program 142 then archives the data to the determined one or more accounts (step 208). In the example embodiment, archive program 142 archives a determined amount of data from archive storage 144 to the determined one or more accounts. In the example embodiment, the determined amount of data that is migrated is based on the threshold percentage value discussed above. For example, if 30 GB of data needs to be migrated from archive storage 144 in order for archive storage 144 to be below the 90% threshold value discussed above, archive program 142 migrates 30 GB to the determined one or more archive storage accounts. The migrated data may be split up as described above. In the example embodiment, archive program 142 transmits a request to the user(s) associated with the determined one or more accounts asking permission to migrate data to the determined one or more accounts. If the user(s) responds affirmatively, archive program 142 continues with the migration. If the user(s) respond in the negative, archive program 142 does not migrate data to the determined one or more archive storage accounts, and instead determines another linked archive storage account in the manner described above. In addition, referring to the example above, the user(s) may respond affirmatively, but request that only 10 GB be migrated to the determined one or more accounts.

In this situation, archive program 142 migrates 10 GB of the 30 GB and determines one or more other accounts to migrate the other 20 GB to. Furthermore, in the example embodiment, the migrated data is encrypted so the user of the archive storage account to which the data is migrated to is not able to gain access. For example, if archive program 142 migrates data from archive storage 144 to archive storage 146, the user of computing device 120 (user associated with archive storage 146) would not be able to access the migrated data without the appropriate permission and login credentials.

In the example embodiment, the user of computing device 110 may be able to download a list, from archive program 142 via network 140, containing all archive storage accounts that archive program 142 has migrated data to (from archive storage 144), and information related to the migrated data. Referring to the example above, where archive program 142 migrates data from archive storage 144 to archive storage 146 and archive storage 148, the user of computing device 110 may download a list containing archive storage 146 and archive storage 148 and the migrated data contained in each archive storage account. Furthermore, the user of computing device 110 may also download a portion or all of the migrated archived data to computing device 110. If the migrated archived data has been split it may be merged locally or merged by archive program 142 and then transmitted to computing device 110.

After archive program 142 has migrated data from archive storage 144 to one or more archive storage accounts, if the one or more archive storage accounts exceed the relevant threshold percentage, archive program 142 may migrate data from the one or more archive storage accounts to another archive storage account in a similar manner as described above. However, in the example embodiment, archive program 142 may not migrate "migrated data" back into the original archive storage account. For example, if archive program 142 migrates data from archive storage 144 to archive storage 146, and subsequently the amount of data stored in archive storage 146 exceeds the threshold percentage, archive program 142 will migrate the necessary amount of data to another archive storage account, however, archive program 142 will not migrate any data back to archive storage 146. In other embodiments, archive program 142 may migrate data from archive storage 146 to any archive storage account including archive storage 144.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

FIG. 3 depicts a block diagram of components of computing device 110, computing device 120, computing device 130, and server 140 of an archive migration system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110, computing device 120, computing device 130, and server 140 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, debugging program 118, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110, computing device 120, computing device 130, and server 140 may also include a R/W drive or interface 314 to read from and write to one or more portable computer readable storage media 326. Application programs 311 on Computing device 110, computing device 120, computing device 130, and server 140 may be stored on one or more of the portable computer readable storage media 326, read via the respective R/W drive or interface 314 and loaded into the respective computer readable storage media 308.

Computing device 110, computing device 120, computing device 130, and server 140 may also include a network adapter or interface 316, such as a TCP/IP adapter card or wireless communication adapter (such as a 4G wireless communication adapter using OFDMA technology). Application programs 311 on Computing device 110, computing device 120, computing device 130, and server 140 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110, computing device 120, computing device 130, and server 140 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for archiving data, the computer program product comprising:
    one or more computer-readable storage devices and program instructions stored on at least one of the one or more computer-readable storage devices, the program instructions comprising:
    program instructions to detect that a threshold value associated with a storage capacity of a first data archive has been exceeded, wherein the first data archive is owned by a first user;
    program instructions to determine a second data archive of one or more other data archives for migration of a portion of data contained in the first data archive, wherein the one or more other data archives are linked to the first data archive based on the content of the first data archive, and wherein the second data archive is owned by a second user;
    program instructions to determine the portion of data in the first data archive to be migrated to the second data archive based on a relationship of the portion of the data to the second user; and
    program instructions to migrate the portion of data from the first data archive to the second data archive.

2. The computer program product of claim 1, further comprising:
    program instructions to send a request to the determined data archive requesting permission to migrate at least a portion of the portion of data.

3. The computer program product of claim 1, wherein the program instructions to determine the second data archive to migrate a portion of data further comprises:
    program instructions to determine a third data archive to migrate the portion of data; and
    program instructions to migrate a first portion of the portion of data to the second data archive and migrating a second portion of the portion of data to the third data archive.

4. The computer program product of claim 3, further comprising program instructions to determine the first portion of the portion of data contains information that is associated with an owner of the second data archive and the second portion of the portion of data contains information that is associated with an owner of the third data archive.

5. The computer program product of claim 3, further comprising program instructions to transmit a list to an owner associated with the first data archive, wherein the list includes information detailing that the first portion of the portion of data has been migrated to the second data archive and the second portion of the portion of data has been migrated to the third data archive.

6. A computer system for determining one or more accounts for the migration of data, the computer system comprising:
    one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
    program instructions to detect that a threshold value associated with a storage capacity of a first data archive has been exceeded, wherein the first data archive is owned by a first user;
    program instructions to determine a second data archive of one or more other data archives for migration of a portion of data contained in the first data archive, wherein the one or more other data archives are linked to the first data archive based on the content of the first data archive, and wherein the second data archive is owned by a second user;
    program instructions to determine the portion of data in the first data archive to be migrated to the second data archive based on a relationship of the portion of the data to the second user; and
    program instructions to migrate the portion of data from the first data archive to the second data archive.

7. The computer system of claim 6, further comprising:
    program instructions to send a request to the determined data archive requesting permission to migrate at least a portion of the portion of data.

8. The computer system of claim 6, wherein the program instructions to determine the second data archive to migrate a portion of data further comprises:
    program instructions to determine a third data archive to migrate the portion of data; and
    program instructions to migrate a first portion of the portion of data to the second data archive and migrating a second portion of the portion of data to the third data archive.

9. The computer system of claim 8, further comprising program instructions to determine the first portion of the portion of data contains information that is associated with an owner of the second data archive and the second portion of the portion of data contains information that is associated with an owner of the third data archive.

* * * * *